United States Patent
Henderson et al.

(10) Patent No.: US 7,233,408 B2
(45) Date of Patent: Jun. 19, 2007

(54) MODULE (75) Inventors: Jim Henderson, Fife (GB); Mel Walter, Wildwood, MO (US); Martin R. Smith, Dundee (GB); Wolf D. Rossmann, Glamis (GB); Paul Nielsen, St. Andrews (GB)

(73) Assignee: NCR Corporation, Dayton, OH (US)

( * ) Notice: Subject to any disclaimer, the term of this patent is extended or adjusted under 35 U.S.C. 154(b) by 1001 days.

(21) Appl. No.: 09/992,231

(22) Filed: Nov. 6, 2001

(65) Prior Publication Data

US 2002/0060808 A1 May 23, 2002

(30) Foreign Application Priority Data

Nov. 22, 2000 (GB) .................................. 0028475.2

(51) Int. Cl.
G06F 15/00 (2006.01)
G06K 1/00 (2006.01)

(52) U.S. Cl. ..................... 358/1.15; 358/1.14; 235/379; 709/231

(58) Field of Classification Search ................ 709/201, 709/231, 224; 358/1.12, 1.15, 1.14; 235/383, 235/379, 380; 713/182; 705/14
See application file for complete search history.

(56) References Cited

U.S. PATENT DOCUMENTS

| 5,247,160 A | | 9/1993 | Zicker | |
| 5,412,761 A | * | 5/1995 | Teradaira | 358/1.12 |
| 5,504,589 A | | 4/1996 | Montague et al. | |
| 5,909,673 A | | 6/1999 | Gregory | |
| 5,983,200 A | | 11/1999 | Slotznick | |
| 6,006,100 A | | 12/1999 | Koenck et al. | |
| 6,119,931 A | | 9/2000 | Novogrod | |
| 6,175,922 B1 | * | 1/2001 | Wang | 713/182 |
| 6,305,603 B1 | * | 10/2001 | Grunbok et al. | 235/379 |
| 6,354,496 B1 | * | 3/2002 | Murphy et al. | 235/383 |
| 6,367,693 B1 | * | 4/2002 | Novogrod | 235/379 |
| 6,457,640 B2 | * | 10/2002 | Ramachandran et al. | 235/379 |
| 6,609,102 B2 | * | 8/2003 | Kolls | 705/14 |
| 6,702,181 B2 | * | 3/2004 | Ramachandran | 235/380 |
| 6,859,832 B1 | * | 2/2005 | Gecht et al. | 709/224 |
| 6,947,995 B2 | * | 9/2005 | Chang et al. | 709/231 |
| 2001/0011680 A1 | * | 8/2001 | Soltesz et al. | 235/379 |
| 2002/0051184 A1 | * | 5/2002 | Fritz et al. | 358/1.15 |

(Continued)

FOREIGN PATENT DOCUMENTS

EP 933733 A2 * 8/1999

(Continued)

Primary Examiner—David Moore
Assistant Examiner—Satwant Singh
(74) Attorney, Agent, or Firm—Priest & Goldstein PLLC (57) ABSTRACT A module (38), a terminal (12) including the module, and a system (10) including the terminal (12), are described. The module may be a printer module (38) comprising a print engine (60), a microcontroller (62), and a wireless receiver (66), such as a wireless modem, so that the module (38) is operable to receive data from a remote server (18) and to print the received data. The module (38) also includes a coupler (70 or 270) for directing data received from the wireless modem (66) to the microcontroller (62) and for directing data from the terminal (12) to the microcontroller (62). A method of printing tickets at a terminal (12) and a method of retro-fitting a self-service terminal (12) are also described.

11 Claims, 5 Drawing Sheets

U.S. PATENT DOCUMENTS

2002/0083121 A1* 6/2002 Chang et al. ............... 709/201

FOREIGN PATENT DOCUMENTS

| | | |
|---|---|---|
| EP | 1 024 626 A1 | 9/2000 |
| GB | 2229559 | 9/1990 |
| GB | 2276258 | 9/1994 |
| GB | 2303478 | 2/1997 |
| WO | WO 94/27258 A | 11/1994 |
| WO | WO 99/21141 | 4/1999 |

* cited by examiner

MODULE

BACKGROUND OF THE INVENTION

The present invention relates to a module, particularly an item dispensing module such as a printer module, and to a terminal including such a module. In particular, the invention relates to a self-service terminal (SST), such as an automated teller machine (ATM), including such a module. The present invention also relates to a method of fulfilling pre-arranged transactions at a self-service terminal.

ATMs typically include a printer module for providing users with transaction receipts, mini statements, and such like. These printer modules typically include a print engine and a microcontroller for controlling the print engine.

The print engine performs printing functions, such as: feeding paper to a print head, printing data onto the fed paper, cutting the printed paper, and feeding the cut printed paper out through a receipt slot in an ATM's fascia for removal by a user.

The microcontroller provides the print engine with the commands and data necessary for performing these printing functions. The microcontroller also monitors the operation of the print engine and provides state of health information to an ATM controller. This state of health information includes the amount of paper remaining.

Printer modules are typically connected to the ATM controller by a secure serial channel because sensitive account information is sent to the printer module by the ATM controller.

There are a large number of ATMs installed throughout the world, most of them owned and operated by financial institutions, and many of these ATMs have printer modules. These ATMs are expensive to purchase and maintain. It is therefore desirable to use these ATMs for other functions in addition to providing financial transactions, so that additional revenue can be generated.

With the increase in electronic transactions, it has become common to purchase tickets by telephone using a credit or debit card.

One problem associated with this is that to enable a purchaser to redeem the ticket, a physical ticket has to be supplied because many venues are not able to accept electronic tickets. Posting a ticket to a purchaser introduces a delay, which makes postal delivery unsuitable for last minute purchase of tickets.

ATMs could be used to print tickets, but it is a complex task to route data through an ATM network. In addition, ATM networks are secure private networks, so many financial institutions would be unwilling to grant access to these networks to third party ticket suppliers.

SUMMARY OF THE INVENTION

According to a first aspect of the present invention there is provided a printer module comprising a print engine and a microcontroller, characterized in that the module includes a wireless receiver, whereby the module is operable to receive data from a remote source and to print the received data.

By virtue of this aspect of the invention, a printer module is provided having a wireless receiver so that a third party can access the printer module directly, thereby bypassing any secure connection to the module, and instruct the module to print a ticket.

Preferably, the printer module includes an authentication component for validating that the remote source has permission to transmit data to the printer module. The authentication component may implement a cryptographic function, for example, to examine a digital certificate provided by the remote source.

Preferably, the wireless receiver is a wireless transceiver, such as a radio frequency (rf) transceiver, so that the transceiver is able to confirm printing to the remote source. If a transceiver is used, then the printer module is able to transmit state of health information, such as the amount of paper remaining in the printer module.

Preferably, the module further comprises a coupler for directing data received from the wireless receiver to the microcontroller. In some embodiments, the wireless receiver and/or the coupler may be incorporated in the microcontroller.

Preferably, a fixed channel is also connected to the coupler, so that the coupler is able to direct data received from the wireless receiver and/or from the fixed channel to the microcontroller. The fixed channel may be a serial or parallel data connection, using a wire or wireless transmission medium.

The microcontroller may store templates (each template representing a predefined image) received via the wireless receiver, to avoid having to receive an image each time a ticket is to be printed.

The coupler may direct data received from both the fixed channel and the wireless receiver if customized data is to be printed together with, for example, financial data received from the fixed channel. For example, a header and footer containing advertising information may be printed on a mini statement; or a background image may be printed on a receipt. Having a wireless receiver for receiving the customized data allows the customized data to be changed very quickly, for example, between transactions. This allows financial institutions to sell advertising space on receipts to a third party without having to update a terminal's application program.

Preferably, the wireless receiver is powered by the printer module. This has the advantage that a separate power supply connection is not required.

According to second aspect of the invention there is provided a terminal comprising a controller in communication with a printer module, characterized in that the printer module includes a wireless receiver, whereby the module is operable to print data received from the controller and to print data received from a remote source via the wireless receiver.

The terminal may be a point of sale terminal, or a self-service terminal such as an ATM (automated teller machine) or a kiosk.

By virtue of this aspect of the invention, any logical and physical security implemented by the terminal is unaffected by the wireless receiver, so that terminal security is not comprised.

When implemented on an ATM, no application changes to the ATM or to a remote transaction host are required. This ensures that a financial institution does not have to change the ATM software or operation.

Preferably, the module further comprises a coupler connected to a fixed channel from a terminal controller and connected to the wireless receiver, so that the coupler is able to direct data received from the fixed channel and/or the wireless receiver to the microcontroller.

The fixed channel may be a serial or a parallel data connection, using a wire or wireless transmission medium.

Preferably, the coupler provides printer access contention management to ensure that the terminal and a remote source do not access the printer module simultaneously.

The terminal may further comprise a display driven by the printer module so that the printer module may display information to a user.

One advantage of having an additional display is that the printer module can present a user with instructions independently of any controller within the terminal; thus, a new message can be displayed on the additional display without having to modify the application flow of the ATM controller program.

According to a third aspect of the invention there is provided a system for printing tickets at a terminal, the system comprising a terminal including a printer module having a wireless receiver, and a server operable to establish a connection with the printer module via the wireless receiver and to transmit data for printing by the printer module.

The terminal may have a secure network connection to a transaction host for authorizing transactions.

By virtue of this aspect of the invention the server is able to route instructions and data directly to the printer without having to route the instructions and data via the transaction host or the secure network.

According to a fourth aspect of the invention there is provided a method of printing tickets at a terminal, the method comprising the steps of: accessing a remote server using a wireless transceiver, providing the remote server with the identity of a terminal having a printer module including a wireless receiver, and requesting the remote server to print a ticket at the identified terminal by wireless transmission of data to the wireless receiver in the printer module.

According to a fifth aspect of the invention there is provided a method of retro-fitting a self-service terminal, the method comprising the steps of: identifying a self-service terminal having an item dispensing module; and modifying the item dispensing module by adding wireless receiver capability.

The item dispensing module may be a printer module, a cd writer module, a DVD writer module, a memory writer module, or such like.

The printer may be modified by adding a wireless receiver thereto to enable the module to receive and print data from a remote source.

By virtue of this aspect of the invention, an SST (such as an ATM) may be modified so that a user can purchase a ticket using a wireless device (such as a telephone or personal digital assistant), and print out the ticket using the SST's printer module. This enables a user to receive a printed ticket from any SST having a retro-fitted printer module.

As only the printer module has to be upgraded, the SST can be retro-fitted quickly and inexpensively to different types of SSTs and to SSTs from different manufacturers.

According to a sixth aspect of the invention, there is provided a method of fulfilling pre-arranged transactions at a self-service terminal, the method comprising the steps of: receiving by wireless communication from a remote location a request to fulfil a pre-arranged transaction; preparing a dispensable item for fulfilling the request; and dispensing the item to a user to fulfil the request.

The pre-arranged transaction may be a pre-paid transaction, such as a transaction where a valuable personalized item has been paid for, but has yet to be personalized and dispensed to fulfil the transaction.

The wireless communication may be received directly by a module having a wireless receiver. The module may be a printer module, a compact disc writer, a DVD writer, a card writer, a memory writer, or such like module that is capable of preparing an item for a user and for dispensing that item to the user. The module may customize the item for each user, for example by including personal details relating to the user, or by allocating a license (such as a copyright license) to the user.

According to a seventh aspect of the present invention there is provided an item dispensing module comprising a dispensing engine and a microcontroller, characterized in that the module includes a wireless receiver, whereby the module is operable to receive instructions from a remote source via the wireless receiver and to dispense items according to the received instructions.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
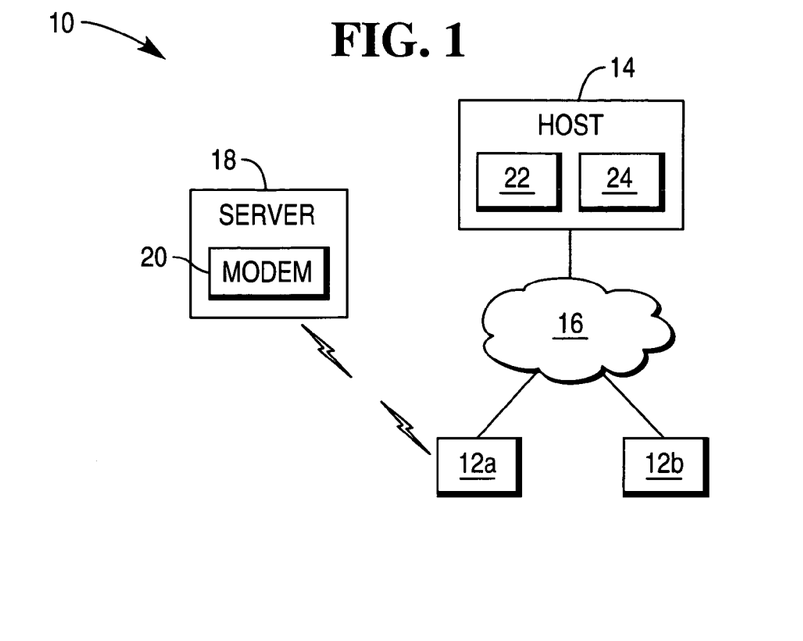
FIG. 1 is a block diagram of a self-service terminal system according to one embodiment of the present invention.

Referring now to FIG. 1, which is a block diagram of a self-service terminal system 10. System 10 comprises a plurality of SSTs in the form of ATMs 12 (only two of which are shown) connected to a remote transaction host 14 by a secure private network 16. System 10 also comprises a Web server 18 including a modem 20.

The host 14 is owned and operated by a financial institution and includes an authorization facility 22 and a back-office facility 24. As is well known in the art, the authorization facility 22 authorizes transactions received from the ATMs 12.

The back-office facility 24 includes details of bank accounts held by customers of the financial institution and stores information relating to transactions executed at the ATMs 12.

Figure 2:
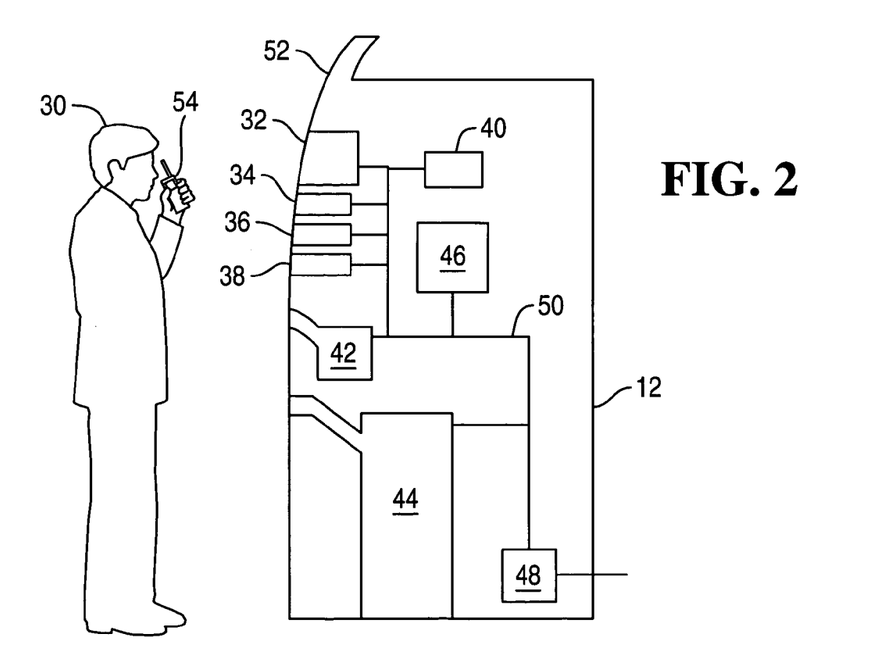
FIG. 2 is a schematic diagram of a self-service terminal of the system of FIG. 1.

Reference is now made to FIG. 2, which illustrates a user 30 operating an ATM 12, and shows the ATM 12 in more detail.

The ATM 12 includes a display module 32, a magnetic card reader/writer (MCRW) module 34, an encrypting keypad module 36, a printer module 38, an internal journal printer module 40, a deposit module 42, a cash dispenser module 44, an ATM controller module 46 for controlling the operation of the various modules, a network connection module 48 for communicating with the remote transaction host 14 (FIG. 1). All of the modules within the ATM 12 are interconnected by an internal bus 50 for securely conveying data.

As shown in FIG. 2, modules 32 to 38, 42, and 44 are located behind a fascia 52, and align with apertures in the fascia 52. The user 30 in FIG. 2 is holding a portable communication device 54 in the form of a WAP-enabled (wireless application protocol) cellular telephone such as a NOKIA 7110 (trade mark) cellphone.

Figure 3:
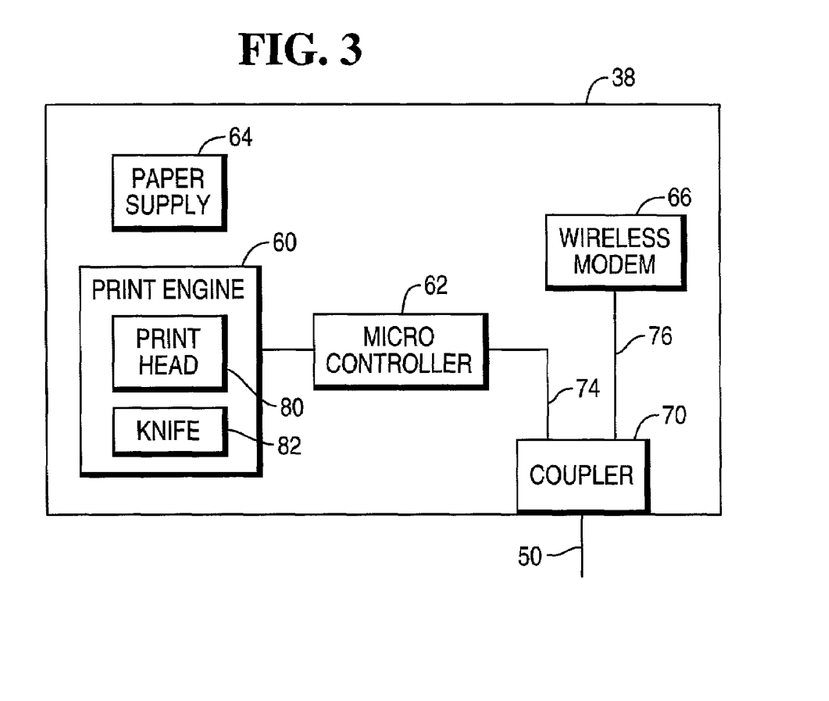
FIG. 3 is a block diagram of a printer module of the terminal of FIG. 2.

Referring to FIG. 3, which shows the printer module 38 in more detail, the printer module 38 comprises a print engine 60 controlled by a microcontroller 62 and fed with paper by a paper supply 64. The module 38 also comprises a wireless receiver 66 (in the form of a wireless modem) connected to the microcontroller 62 by a coupler 70. The coupler 70 is also connected to the ATM modules (32 to 36 and 40 to 48) by the internal bus 50 (a fixed channel).

The print engine 60, microcontroller 62, wireless receiver 66, and coupler 70 are all powered by the printer module 38, which receives power from a wiring harness (not shown) coupled to all the modules in the ATM 12.

A print data bus 74 connects the coupler 70 to the microcontroller 62; and a receiver bus 76 connects the wireless modem 66 to the coupler 70.

The print engine 60 includes a thermal print head 80 for applying print data to paper, and a knife 82 for cutting the printer paper.

The microcontroller 62 includes firmware for instructing the print engine to transport, print, and cut the paper, so that a user is provided with a printed receipt or ticket.

Figure 4:
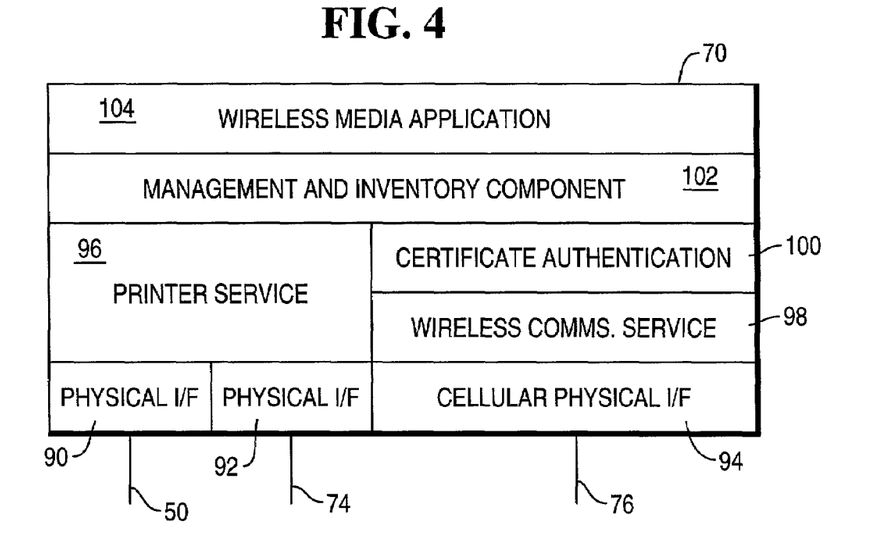
FIG. 4 is a multi-layer diagram illustrating the components of one of the parts (the coupler) of the printer module of FIG. 3.

Reference is now made to FIG. 4, which is a multi-layer diagram illustrating the software and hardware components in the coupler 70.

The internal bus 50 and the print data bus 74 each couple to a respective physical socket 90, 92 in the form of an RS 232 connector. The receiver bus 76 couples to a physical socket in the form of a PCMCIA connector 94.

A printer service software component 96 contains drivers for the connectors 90, 92; and implements the low-level tasks of formatting data received or to be transmitted via the connectors 90, 92. The printer service 96 also implements the transmission protocol, and filters out data from a transmission.

Similarly, a wireless communication service software component 98 contains drivers for the connector 94; and implements the low-level tasks of formatting data received or to be transmitted via the connector 94. The wireless communication service 98 also implements the transmission protocol, and filters out data from a transmission.

The wireless communication service 98 includes a certificate authentication component 100 that implements any encryption scheme used and examines digital certificates received via the wireless modem 66 to determine their validity. The certificate authentication component 100 verifies that the data received via the wireless modem 66 is authentic to avoid a fraudulent third party printing data via the modem 66.

A management and inventory component 102 is in communication with both printer service 96 and wireless communication service 98. The management and inventory component 102 determines which bus (internal 50 or receiver 76) has access to microcontroller 62 at any given time; thereby avoiding any possible contention. The management and inventory component 102 also maintains the state of health of the print engine 60, particularly the amount of available paper; and records what templates, if any, are stored by microcontroller 62.

A wireless media application program 104 controls operation of the coupler 70 and determines factors such as what images are to be printed, at what time, and such like.

Figure 5:
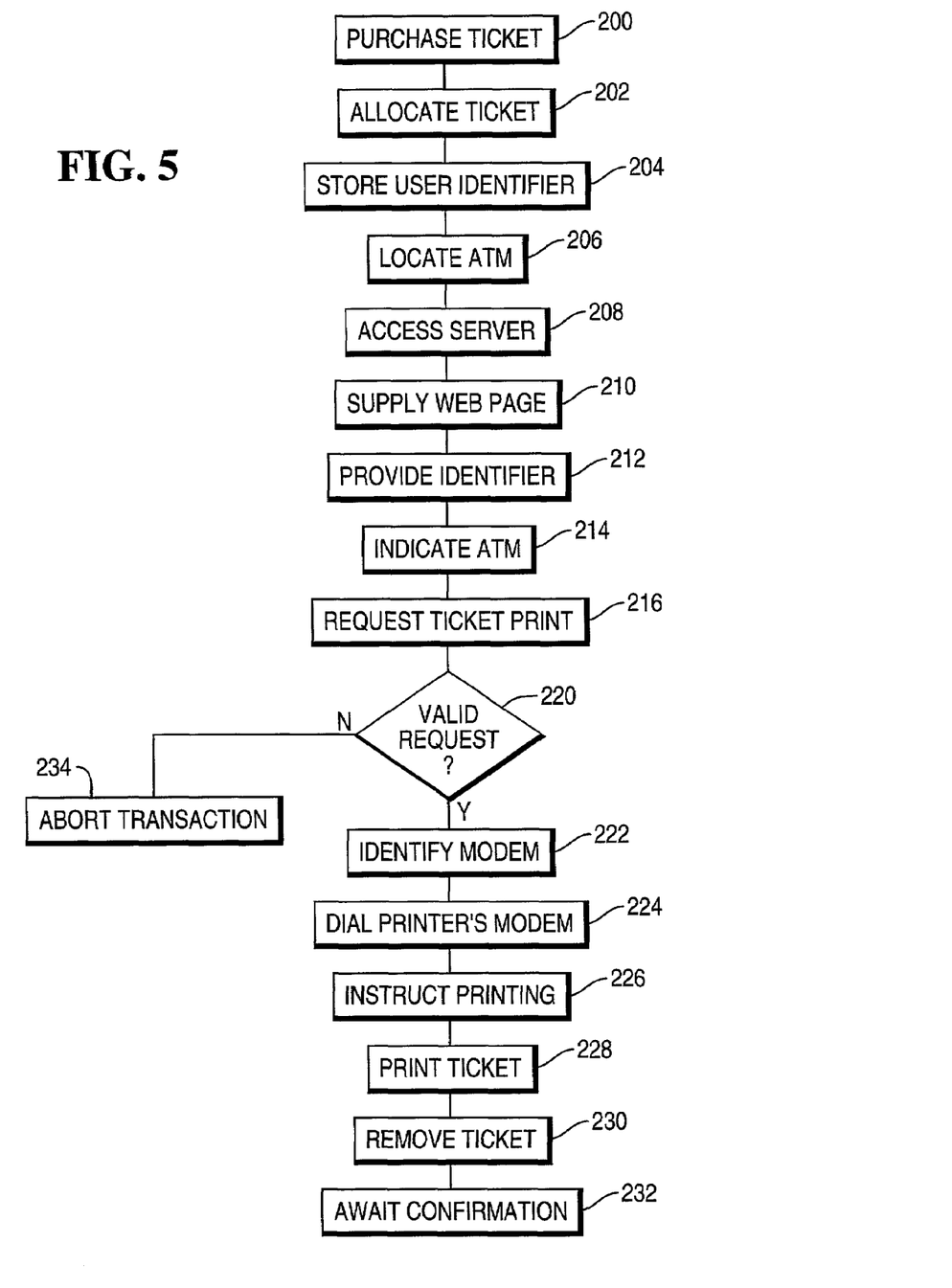
FIG. 5 is a flowchart illustrating the steps involved in a user obtaining a pre-purchased ticket using the system of FIG. 1.

A typical transaction using printer module 38 to print a pre-purchased concert ticket will now be described with reference to FIG. 5, which is a flowchart illustrating the steps involved in a user obtaining a pre-purchased ticket.

The user 30 purchases a ticket (step 200) in a conventional manner, for example using a credit or debit card, using a conventional sales channel, for example, a Web sales page or a telephone sales line. The user is then provided with an identifier by the sales channel.

When a ticket is allocated to this user (step 202) the identifier and the user's name is associated (step 204) with the allocated ticket. The identifier may be the telephone number of the user's cellular telephone 54, or some other convenient code.

The user then locates (step 206) and approaches an ATM 12 having a ticket printing facility. The ATM 12 may include a poster or advertisement indicating that tickets may be printed using the ATM 12.

When the user 30 is at the ATM 12, the user 30 accesses (step 208) the server 18 using the cellphone 54. The URL associated with the server 18 may have been supplied to the user 30 when the ticket was purchased.

The server 18 supplies (step 210) a microbrowser in the user's cellphone 54 with a ticket fulfillment Web page displaying selectable options.

The user selects a 'local ticket printing' option using the cellphone's keypad. The server 18 receives this selection and provides the user 30 with a ticket identification Web page.

On the ticket identification Web page the user 30 enters using the cellphone's keypad his/her name and the ticket identifier (step 212) to indicate the ticket to be printed. The server 18 receives this selection and provides the user 30 with an ATM identifier Web page.

On the ATM identifier Web page the user 30 enters an ATM identification (step 214) to indicate what ATM the user is standing beside. The ATM identification is typically displayed on the ATM 12 in some convenient manner, for example, it may be printed on the ATM 12.

The user 30 is then provided with a Web page showing details of the ticket that is available for printing and having a field for requesting printing of this ticket.

After requesting printing of this ticket (step 216), the user waits for the ticket to be printed by the ATM 12.

Once the user 30 has requested printing of the ticket, the server 18 determines whether the request is valid (step 220). This involves checking that the identifier provided by the user 30 matches the identifier associated with the ticket sold to that user 30.

If the request is valid, then the server 18 obtains the telephone number (step 222) of the wireless modem 66 of the ATM 12 identified in step 214. The server 18 contains a lookup table (LUT) listing each ATM that has the ticket printing facility and the wireless modem telephone number associated with that ATM.

The server 18 then uses modem 66 to dial (step 224) the telephone number obtained from the LUT to establish a wireless connection with the printer module 38.

The server 18 then uses modem 20 to transmit ticket information and a digital authorization certificate to the wireless modem 66 (FIG. 3) to instruct printing of the ticket (step 226).

The printer module 38 then prints the ticket (step 228), and the user 30 removes (step 230) the ticket. The user 30 may then present the ticket at a concert venue in respect of which the ticket was sold for admission to the concert.

The server 18 awaits confirmation (step 232) from the printer module 38 that the ticket has been printed.

If, in step 220, the print request was not valid, then the transaction is aborted (step 234).

Figure 6:
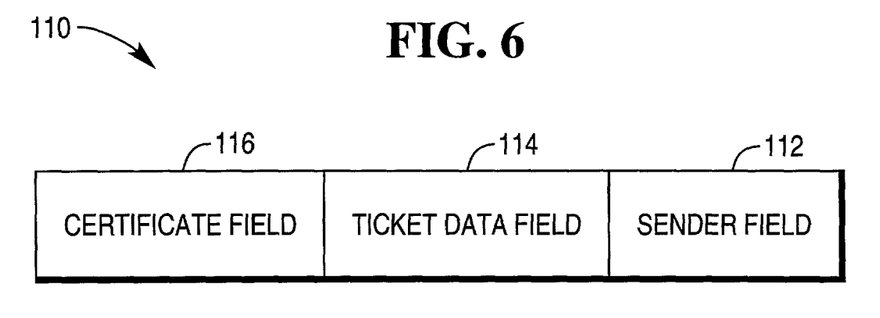
FIG. 6 is a schematic diagram illustrating the data structure format of ticket information transmitted to the terminal of FIG. 2.

Referring again to FIGS. 3 and 4, and also to FIG. 6, which shows the data structure format of ticket information 110, the printing step (step 228) will now be described in more detail.

In step 228, the wireless modem 66 receives the ticket information from the server's modem 18 and conveys this information to the coupler 70 via receiver bus 76.

The ticket information 110 has a sender field 112, a ticket data field 114, and a certificate field 116. The sender field 112 includes details of the server 18 transmitting the ticket information 110; the ticket data field 114 is a computer language description of the ticket to be printed; and the certificate field 116 includes a signed digital certificate guaranteeing that the ticket information was sent by the sender indicated in sender field 112.

The coupler 70 receives this ticket information 110 at the PCMCIA connector 94, and the wireless communication service 98 filters out the print data from the ticket data field 114 and the digital authorization certificate from the certificate field 116.

The wireless communication service 98 conveys the print data to the management and inventory component 102, and conveys the digital authentication certificate to the certificate authentication component 100.

The certificate authentication component 100 examines the digital authentication certificate to ensure that the ticket information was transmitted by the server 18.

If the digital authentication certificate is not valid then the received print data is ignored and a response is sent to the server 18 to indicate that the ticket will not be printed due to a certificate authentication failure.

If the digital authentication certificate is valid then the print data is conveyed through the management and inventory component 102 to the wireless media application 104.

The wireless media application 104 conveys the print data to the microcontroller 62 (via the management and inventory component 102, the printer service 96, and physical interface 92).

The microcontroller 62 receives this print data and controls the print engine 60 so that a ticket is printed conforming to the print data, and delivered to the user 30.

If the ticket is to be printed on special paper, then the microcontroller 62 ensures that the special paper is fed into the print engine when the ticket is to be printed.

If there is an error in printing (such as insufficient paper or a print head error) then the microcontroller 62 reports this error to the management and inventory component 102 (via the physical interface 92 and the printer service 96), which sends a message to the server 18 informing the server 18 that a ticket could not be printed.

If there is a fault with the printer 38 then the management and inventory component 102 may transmit a message to a service company to indicate that the printer module requires servicing.

If the server wishes to advertise tickets for sale, the server 18 may transmit advertising information referencing a template stored in the microcontroller 62. When the wireless media application 104 receives this advertising information, it appends it to receipt data or mini statement data emanating from the ATM controller 46 on the internal bus 50, so that the microcontroller 62 prints a receipt or mini statement including the advertising information.

If the server wishes to use a new advertisement template, then the server 18 may transmit the new template to the microcontroller 62 via the wireless modem 66 and the coupler 70.

The management and inventory component 102 may store audit data relating to the number of tickets printed and the server 18 that requested printing of each ticket. This audit data may be used for charging each server 18 for the number of tickets printed.

Figure 7:
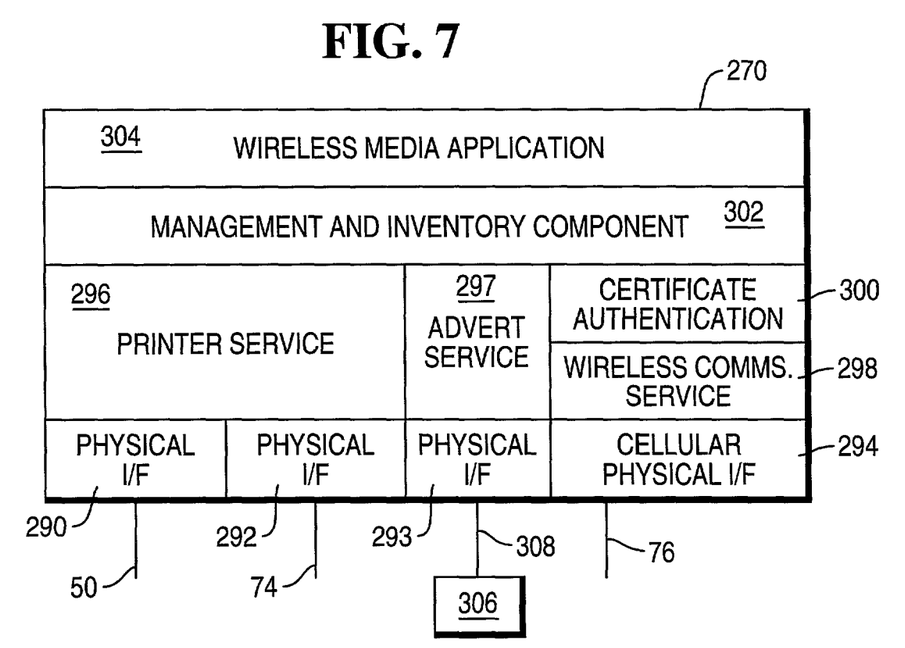
FIG. 7 is a multi-layer diagram illustrating a component (an alternative coupler) used in an alternative embodiment of the present invention.

Another embodiment of the present invention will now be described with reference to FIG. 7, which is a multi-layer diagram illustrating an alternative coupler 270 and an associated display 306 in the form of an LCD panel 306.

Coupler 270 is similar to coupler 70 (FIG. 4), but coupler 270 includes another physical interface 293 in the form of an LCD driver; and an advert service 297 that sends data to the LCD panel 306 via the LCD driver 293 and an LCD bus 308.

The server 18 can send information for displaying on the LCD panel 306 via the wireless modem 66 and the coupler 270. This enables the server 18 to provide a user with status information, such as "Your ticket is being printed", and with instructions, such as "Please remove your ticket from the receipt slot". This also enables the server 18 to send advertisements to the LCD panel 306 to attract users of the ATM 12. As the advertisements, information, and instructions, are all sent directly from the server 18 to the printer module 38, the ATM application program does not require any modification.

Currently installed ATMs may be upgraded by retrofitting the ATM with the printer module described with reference to FIG. 3. This involves removing a currently installed printer module from an ATM, and inserting the printer module described with reference to FIG. 3. If an additional display 306 is used, then this may be mounted adjacent or in proximity to the currently installed ATM.

Figure 8:
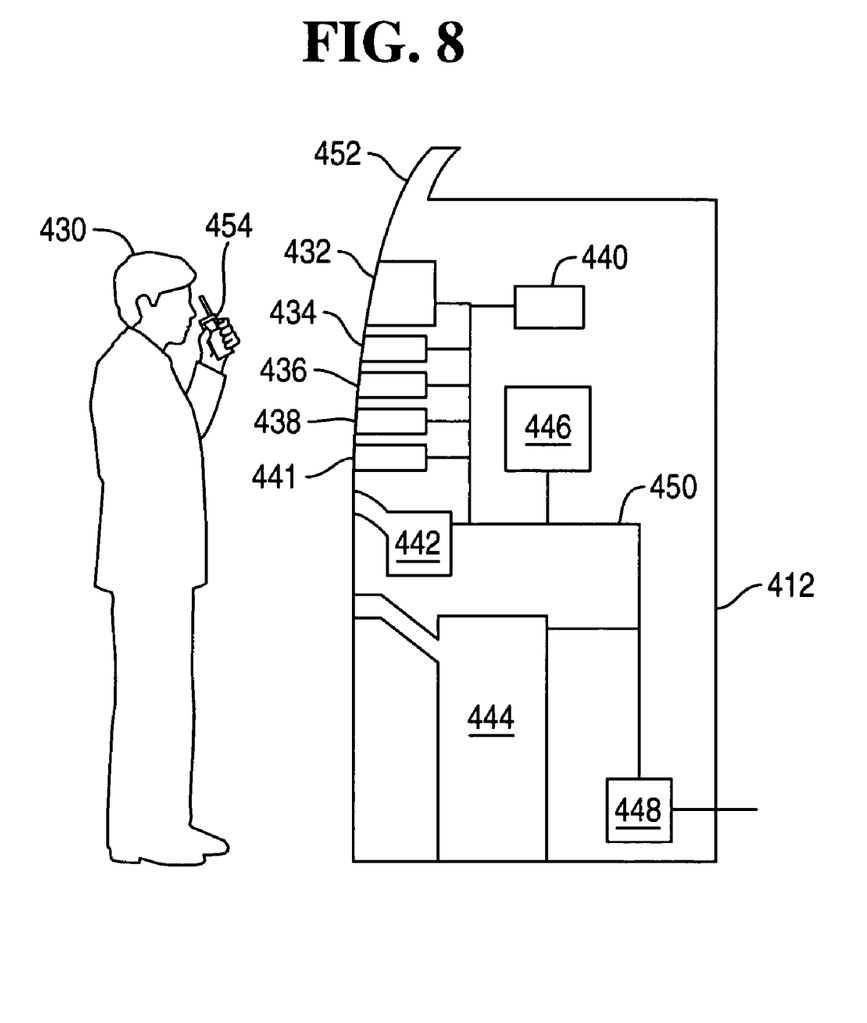
FIG. 8 is a schematic diagram of a self-service terminal according to another embodiment of the present invention.

Yet another embodiment of the present invention will be described with reference to FIG. 8, which is a schematic diagram of an alternative self-service terminal 412 in the form of an ATM being operated by a user 430. ATM 412 comprises a display module 432, a magnetic card reader/writer (MCRW) module 434, an encrypting keypad module 436, a printer module 438, an internal journal printer module 440, a cd writer module 441, a cash acceptor module 442, a cash dispenser module 444, an ATM controller module 446 for controlling the operation of the various modules, a network connection module 448 for communicating with the remote transaction host 14 (FIG. 1). All of the modules within the ATM 412 are interconnected by an internal bus 450 for securely conveying data.

A typical transaction using ATM 412 is similar to the typical transaction described with reference to FIG. 5, the main difference being that the user 430 may purchase a music or software item using a cellular phone and receive the purchased item from the cd writer module 441 in the ATM 412.

Various modifications may be made to the above described embodiment within the scope of the invention, for example, parallel buses may be used instead of serial buses. Connectors other than RS232 and PCMCIA connectors may be used. In other embodiments, a user may access the server by dialing a telephone number associated with the server; the server's modem would automatically answers the call and presents the user with an audible and/or graphical menu of options to select using the user interface of the user's cellular telephone. Voice and text based menu options that may be selected using a telephone's keypad or using spoken commands are well-known. In other embodiments, the printer module controller may include a Web component for receiving print requests from the server 18 via the Web. In other embodiments, the microcontroller may determine whether a printed ticket has been removed by the user, and may send confirmation of removal of the ticket to the server. In other embodiments, a different protocol to WAP may be used by the user's cellphone. In other embodiments, the portable communication device may be a PDA having a wireless transceiver or a portable PC having a wireless transceiver. In other embodiments, the server may require a user to log in before they can request a ticket to be printed. The log in routine may require the user to enter a username and a passcode (comprising a sequence of characters such as letters and/or numbers); the user may then be able to review any tickets they have bought but not yet printed out. Although the specific embodiments relate primarily to tickets, it will be appreciated that the present invention is also suitable to dispensing of other items, such as personalized financial instruments, coupons, passes, vouchers, other valuable media, and other customizable dispensable items.

What is claimed is:

1. A method of supporting self-service terminal transactions and printing tickets at a self-service terminal, the method comprising the steps of:
   receiving authorizations for self-service terminal transactions at a self-service terminal from a transaction host over a secure network connection;
   wirelessly transmitting the identity of the self-service terminal from a portable communication device to a remote server, the self-service terminal having a printer engine, the printer engine coupled to both a wireless receiver and a fixed channel, the printer engine operating to receive print data from both the wireless receiver and the fixed channel;
   requesting the remote server to print a ticket at the identified terminal by the portable communication device;
   wirelessly transmitting ticket information to the wireless receiver from the remote server; and
   receiving ticket information at the printer engine from the wireless receiver.

2. The method of claim 1 wherein the self-service terminal is an automated teller machine (ATM).

3. The method of claim 1 further comprising:
   printing the ticket information at the self-service terminal by the printing engine.

4. The method of claim 3 further comprising:
   wirelessly transmitting confirmation of the printed ticket to the remote server.

5. The method of claim 1 wherein the self-service terminal includes a coupler to determine whether data received from the wireless receiver or the fixed channel is directed to the printer engine at any given time.

6. The method of claim 1 further comprising:
   storing a plurality of templates, each template representing a predefined image to limit the amount of ticket information wirelessly transmitted.

7. The method of claim 1 further comprising:
   downloading specific web pages to assist a user in ticket printing from the remote server to the portable communication device.

8. The method of claim 1 further comprising:
   transmitting authentication data from the portable communication device to the self-service terminal;
   authenticating said authentication data by the self-service terminal; and
   printing the ticket by the self-service terminal only upon authenticating said authentication data.

9. A method of retro-fitting a self-service terminal supporting self-service terminal transactions to add the ability to print tickets at the self-service terminal, the method comprising the steps of:
   identifying a self-service terminal having a printer module, the printer module coupled to a fixed channel of the self-service terminal;
   coupling a wireless receiver to the printer module; and
   providing the fixed channel and the wireless receiver alternative access to the printer module to retrofit the self-service terminal to support printing of self-service terminal transaction data when the fixed channel has access to the printer and to print tickets when the wireless receiver has access to the printer.

10. A method according to claim 9, wherein the self-service terminal is an automated teller machine (ATM) and wherein the fixed channel couples the ATM to an ATM network, the method further comprising:
    receiving authorization for a financial transaction at the ATM from a transaction host over a secure ATM network connection; and
    printing financial transaction information received from the ATM network by the printer module.

11. The method of claim 9 further comprising:
    printing customized data received from the wireless receiver.

* * * * *